United States Patent
Kerr (10) Patent No.: US 9,565,124 B2
(45) Date of Patent: Feb. 7, 2017

(54) LOW-LATENCY NETWORK INTERFACE

(71) Applicant: KnuEdge Incorporation, San Diego, CA (US)

(72) Inventor: Richard Kerr, San Diego, CA (US)

(73) Assignee: KnuEdge Incorporated, San Diego, CA (US)

(*) Notice: Subject to any disclaimer, the term of this patent is extended or adjusted under 35 U.S.C. 154(b) by 0 days.

(21) Appl. No.: 15/068,407

(22) Filed: Mar. 11, 2016

(65) Prior Publication Data
US 2016/0269307 A1 Sep. 15, 2016

Related U.S. Application Data (60) Provisional application No. 62/131,611, filed on Mar. 11, 2015.

(51) Int. Cl.
*H04L 7/06* (2006.01)
*H04L 25/40* (2006.01)
*H04L 12/875* (2013.01)

(52) U.S. Cl.
CPC ................................ *H04L 47/56* (2013.01)

(58) Field of Classification Search
USPC ....... 375/141, 150, 354, 145, 146, 147, 211, 375/219, 220, 222, 239, 240, 375/240.26–240.28, 259, 285, 284, 278, 375/295, 296, 316, 324, 346, 340, 355, 375/358, 359, 368, 366, 365
See application file for complete search history.

(56) References Cited

U.S. PATENT DOCUMENTS

| | | | | |
|---|---|---|---|---|
| 4,087,642 A * | 5/1978 | Jessop | ................. | H04L 25/4923 370/477 |
| 4,451,916 A * | 5/1984 | Casper | ............... | H04B 10/2504 370/226 |
| 5,512,896 A * | 4/1996 | Read | ....................... | H03M 7/42 341/65 |
| 5,636,208 A * | 6/1997 | Chang | .................... | H04L 1/0057 370/347 |
| 7,362,864 B2 * | 4/2008 | Kryzak | ............. | H04L 25/03866 380/260 |
| 9,197,298 B2 * | 11/2015 | Kim | ...................... | H04B 7/0417 |
| 2004/0081228 A1 * | 4/2004 | Lee | ...................... | H04B 1/7075 375/141 |

(Continued)

OTHER PUBLICATIONS http://www.ieee802.org/3/10GBCX4/public/jan03/WPcls48_1_0.pdf, "48. Physical Coding Sublayer (PCS) and Physical Medium Attachment (PMA) sublayer, type 10GBASE-X", Proposal for an initial draft of 10GBaseCX4 (2003) Downloaded from the Internet Mar. 17, 2016, pp. 285-316.

(Continued)

*Primary Examiner* — Linda Wong
(74) *Attorney, Agent, or Firm* — Fish & Richardson P.C.

(57) ABSTRACT

Methods, systems, and apparatus for a low-latency network interface. One of the methods includes receiving a signal having encoded data. A bit stream is generated from the received signal. Bits of the bit stream are shifted into a shift register until a feedback signal generated by a synchronization decoder is received. After the feedback signal is received, output of the shift register is descrambled to generate descrambled data. The descrambled data is stored in a first parallel register when the synchronization decoder determines that the data in the shift register is aligned to a word boundary. If the data in the first parallel register is properly aligned, the output is stored in a second parallel register.

20 Claims, 4 Drawing Sheets

(56) References Cited

U.S. PATENT DOCUMENTS

| | | | | |
|---|---|---|---|---|
| 2005/0073555 A1* | 4/2005 | Huang | ................ | B41J 2/04528 347/60 |
| 2005/0207280 A1* | 9/2005 | Fowler | .................... | H03M 9/00 368/10 |
| 2006/0200708 A1* | 9/2006 | Gentieu | .................. | H04L 1/243 714/704 |
| 2007/0098160 A1* | 5/2007 | Lablans | .............. | H04L 25/4904 380/46 |
| 2008/0077771 A1* | 3/2008 | Guttag | ...................... | G06F 7/53 712/204 |
| 2009/0073037 A1* | 3/2009 | Penna | .................... | G01S 19/24 342/357.63 |
| 2014/0362990 A1* | 12/2014 | Kim | ................. | H04L 25/03872 380/268 |

OTHER PUBLICATIONS

IEEE 802.3, https://en.wikipedia.org/wiki/IEEE_802.3, Wikipedia, downloaded from the Internet Mar. 17, 2016, 7 pages.

* cited by examiner

LOW-LATENCY NETWORK INTERFACE

CROSS-REFERENCE TO RELATED APPLICATIONS

This disclosure claims priority to U.S. Provisional Application Ser. No. 62/131,611, filed Mar. 11, 2015, the disclosure of which is incorporated herein by reference in its entirety.

BACKGROUND

This specification relates to network interface devices.

The physical layer of conventional network protocol stacks include components that serialize and deserialize bit streams, scramble and descramble data, and perform synchronization to align the data to word boundaries.

For example, the IEEE 802.3 Ethernet standard defines a Physical Medium Attachment (PMA) layer and a Physical Coding Sublayer (PCS). These two layers lie between the communication medium at the lowest level and the Gigabit Media Independent Interface (GMII) or extended GMII (XGMII) layers.

The PMA layer receives a serialized bit stream, recovers the clock, and deserializes the data. The PCS layer descrambles the data and performs synchronization to determine the word boundaries of the data.

SUMMARY

This specification describes a system implementing a low-latency network interface. The low-latency network interface performs substantially the same operations of serialization and deserialization, scrambling and descrambling, and word synchronization, as required by industry standards, but in less time than is possible in prior art methods, e.g., those described in the IEEE 802.3 standard.

The system achieves low-latency network communication by performing some aspects of synchronization and descrambling out of the path of the data. In other words, these operations are not performed inline. Thus, in this specification, "low-latency" refers to at least partially parallel synchronization and descrambling of the data, which causes received data to enter the PMA layer and exit the PCS layer in fewer clock cycles than would be required if synchronization and descrambling were performed inline, e.g., as described by the IEEE 802.3 standard.

Particular embodiments of the subject matter described in this specification can be implemented so as to realize one or more of the following potential advantages. A low-latency network interface dramatically reduces the latency in transforming a signal into output data. The design of the low-latency interface as described in this specification is applicable to any arbitrarily long word length standard implemented now or in the future. The system can prealign entire incoming code words in the PMA layer, rather than aligning only the portions of data that can fit in the shift register of the PMA layer. Further these techniques can be extended as the standards evolve to allow the same time savings as the processing complexity grows.

Details of one or more embodiments of the subject matter of this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
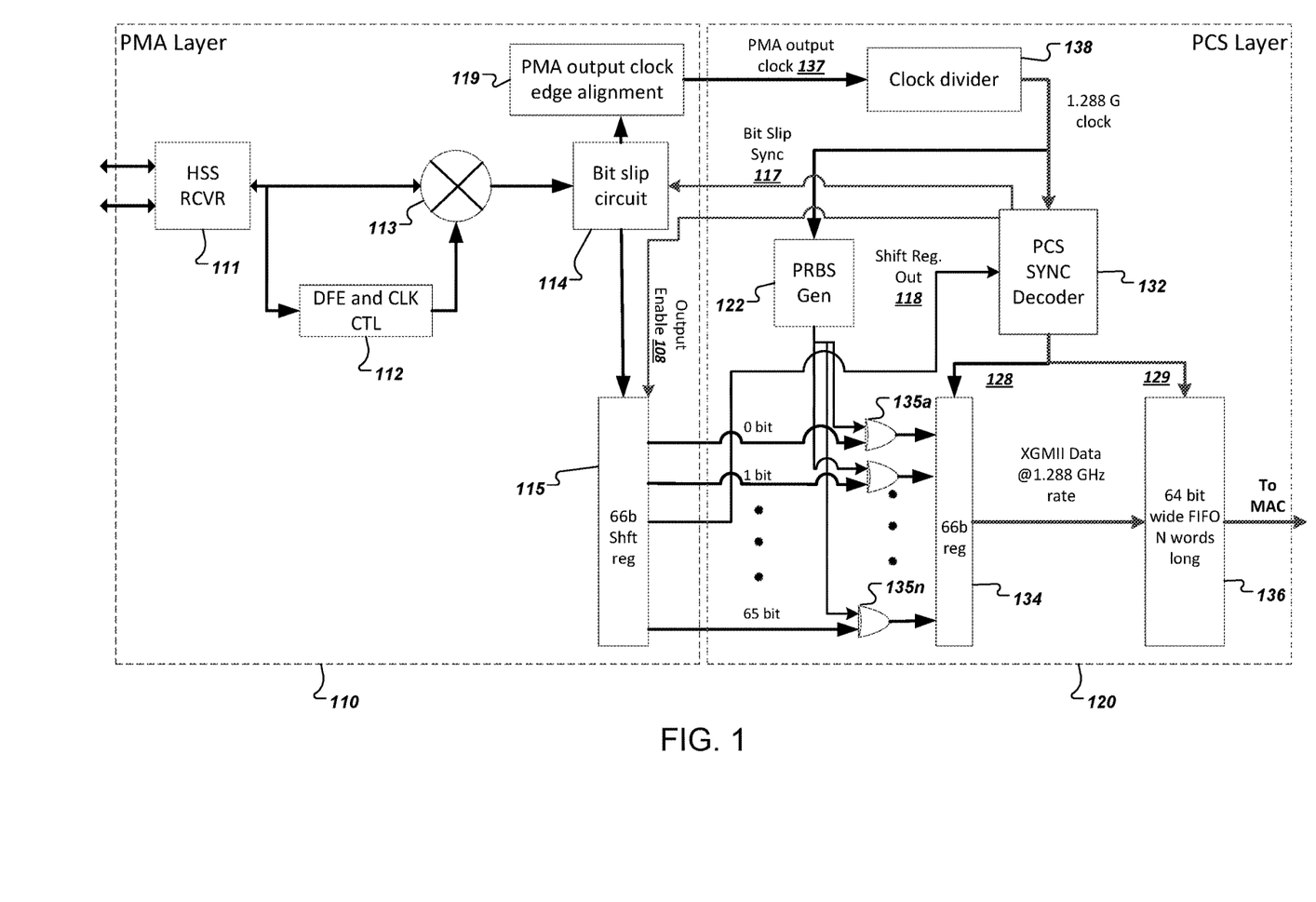
FIG. 1 illustrates the architecture of the receiving end of an example low-latency network interface system.

FIG. 1 illustrates the architecture of the receiving end of an example low-latency network interface system. The system includes a PMA layer 110 and a PCS layer 120. The PMA layer 110 and the PCS layer 120 can be implemented as separate devices or subsystems, or they can be implemented on a same device or subsystem.

For clarity of explanation, this example illustrates a system having a 66-bit shift register in order to deserialize words encoded in 66/64 encoding, in which a 2-bit sync word is added to every 64-bit data word. The combination of the sync word plus the data word may also be referred to as a code word. For brevity, a "word" in this specification may refer to data words or code words, the meaning of which will be apparent from the context. The system descrambles and synchronizes the 66-bit input to generate an output that is a 64-bit word. But the same techniques can also be applied in systems having a shift register of arbitrarily size, e.g., 258 bits, 514 bits, or 1026 bits, to name just a few examples.

FIG. 1 also illustrates an example output data rate of 1.288 GHz. However, the same techniques can be used in systems that having any appropriate line rate and data rate. In some implementations, the line rate is an integer multiple of the data rate.

The PMA layer 110 includes a high-speed SerDes receiver (HSS RCVR) 111, a digital front-end and clock control (DFE and CLK CTL) module 112, a mixer 113, a bit slip circuit 114, a shift register 115, and a PMA output clock edge alignment module 119.

The HSS RCVR 111 receives a signal from a Medium Dependent Interface (MDI) layer of whatever communication medium is being used. The received signal contains a representation of a serialized bit stream.

The DFE and CLK CTL module 112 receives the signal and recovers the clock rate of the signal. For example, the DFE and CLK CTL module 112 can determine the period of the clock by detecting edge transitions in the received signal. The DFE and CLK CTL module 112 then provides the recovered clock rate to a mixer 113. The system uses the mixer 113 with the recovered clock rate and the original signal to determine the values of individual bits in the received signal. The output of the mixer 113 is then a serialized bit stream.

The bits of the serialized bit stream are received by a bit slip circuit 114. The bit slip circuit 114 shifts the bits of the serialized bit stream into the shift register 115 one bit at a time at a unit interval (UI) clock rate determined by the incoming bit stream. The bit slip circuit 114 shifts the bits as long as a bit slip sync signal 117, or a lack of one, indicates that the bit slip circuit 114 should continue to do so. However, the bit slip sync signal 117, or a lack of one, received by the bit slip circuit 114 may direct the bit slip circuit 114 to slip one or more bits, e.g., to temporarily stop shifting bits into the shift register 115. For example, when the bit slip sync signal 117 is received, the bit slip circuit 114 can slip one UI clock, causing the data in the shift register 155 to become aligned along the code word boundaries from the bit stream. This allows a slower circuit to slip a bit without having to align to the UI clock rate.

In other words, by using the bit slip sync signal 117, the system can prealign the data along code word boundaries in the shift register 115. Thus, the output of the PMA layer 110 is already aligned to the word boundaries of the received data.

In addition, the system can align entire words of the incoming data in the shift register, rather than only aligning portions of the words. To do so, the system can have a shift register that is at least the length of the longest word of the incoming data. For example, if using a 66/64 encoding, the system can use a shift register that is at least 66 bits. The system can also use shift registers that are significantly longer than the words of the incoming data, e.g., 258, 514, or 1026 bits, in order to prealign words for future encoding standards.

The bit slip circuit 114 also provides the recovered PMA clock to a PMA output clock edge alignment module 119. The PMA output clock edge alignment module 119 provides the recovered PMA output clock 137 to the PCS Layer 120.

To prealign the data in the shift register 115, the system uses a PCS Sync Decoder 132 in the PCS layer 120. The PCS Sync Decoder 132 generally determines when an encoded string of bits is aligned along a word boundary according to the sync bits in the data. For example, if using a 66/64 encoding, the data is properly aligned when the sync bits are 01 or 10.

The PCS Sync Decoder 132 is connected to and receives the output 118 of the PMA shift register 115 at the line rate. At each PMA output clock 137, the PCS Sync Decoder 132 determines whether the data in the shift register 115 is aligned to a word boundary. When the output 118 of the shift register 115 is aligned to a word boundary, the PCS Sync Decoder 132 deasserts the bit slip sync signal 117 to the bit slip circuit 114. This feedback causes the bit slip circuit 114 to lock the word-aligned data in the shift register 115 to the proper alignment.

The PCS Sync Decoder 132 then issues an output enable signal 108 to the shift register 115, which causes the PMA layer 110 to issue the transfer of the parallel word to the PCS layer 120. When this occurs, the data in the shift register 115 is aligned along word boundaries. But the data still needs to be descrambled and the alignment verified by the PCS layer 120.

A pseudorandom binary sequence generator (PRBS GEN) 122 is used to generate a code that when digitally multiplied by the scrambled data results in descrambled data. The PRBS GEN 122 is clocked at a slower rate computed by a clock divider 138. The clock divider 138 receives the PMA output clock 137 provided by the PMA output clock edge alignment module 119. The clock divider 138 then generates a slower clock signal that is an integral division of the rate of the PMA output clock 137. By using the PMA output clock 137, when the data is word-aligned, the clock edge for the word is also aligned.

The digital multiplication for descrambling the data can be performed by any appropriate digital multiplication module. In the example system shown in FIG. 1, the digital multiplication is implemented using a wide, unclocked XOR gate. Thus, each bit from the output of the shift register 115 is one input to a respective XOR gate 135*a* through 135*n*, and the other respective inputs to the XOR gates come from the code generated by the PRBS GEN 122. The PRBS GEN 122 being clocked by the output of the clock divider 138 causes the code generated by the PRBS GEN 122 to be aligned to the output of the shift register 115.

The output of the XOR gates 135*a-n* is digitally multiplied data. However, the digitally multiplied data is only validly descrambled data when the output of the shift register 115 is aligned to a word boundary. Thus, when the PCS Sync Decoder 132 determines that the word is aligned, the PCS Sync Decoder 132 issues an enable signal 128 to a first parallel register 134. This causes the first parallel register 134 to trap the descrambled output of the PMA layer 110.

The PCS Sync Decoder 132 then inspects the data in the first parallel register 134 to ensure that the bits are aligned to the start of the word bits. The PCS Sync Decoder 132 is also clocked at the slower rate computed by a clock divider 138.

If synchronization is lost, the PCS layer 120 will signal that there is a bit loss to a system monitor. Synchronization can then start from beginning, or the system could instead perform a series of bit slips, e.g., 1 GHz bit slips or any appropriate clock rate, until the first parallel register 134 is once again aligned. This process can also improve the reframing error time of the entire PMA layer 110 and the PCS layer 120.

If the data in the first parallel register 134 is aligned, the PCS Sync Decoder 132 issues another enable signal 129 to a second parallel register 136. The second parallel register 136 is an output register that provides the output data to higher levels of the networking protocol stack, e.g., to the Media Access Control (MAC) layer. In the example system of FIG. 1, the output register is implemented as a 64-bit wide first-in, first-out (FIFO) queue that is N words long. Thus, when the PCS Sync Decoder 132 issues the enable signal 129, the resulting descrambled word is stored at the end of a FIFO queue at the output register 136.

Because the example system performs descrambling and synchronization outside of the path of the data and uses the recovered PMA clock for synchronization, the system can use a faster clock than prior art methods to clock the data from the output of the PMA layer 110 through the PCS layer 120. In this example, data can be clocked through the system in just three clock cycles. In addition, the clock cycles that are used are faster than is possible with prior art methods, e.g., on the order of nanoseconds with currently available hardware.

Figure 2:
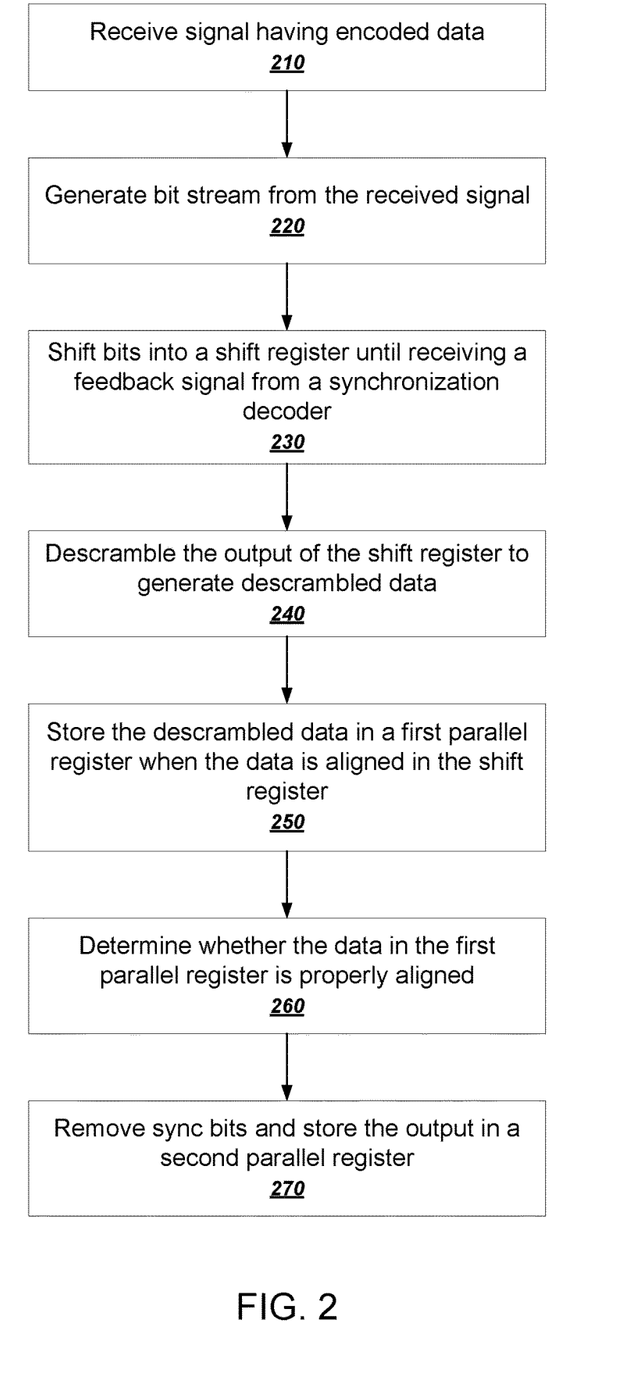
FIG. 2 is a flow chart of an example process for transforming a received signal into output data using a low-latency network interface.

FIG. 2 is a flow chart of an example process for transforming a received signal into output data using a low-latency network interface. In general, the system uses a feedback signal from a synchronization decoder to determine when the data from a bit stream is aligned to a word boundary. The process will be described as being performed by an appropriately configured system having several functional components, e.g., the system as described above with reference to FIG. 1.

The system receives a signal having encoded data (210). For example, the system can receive a signal from a MDI layer of a network interface device. The data encoded into the signal can include sync bits that indicate word boundaries in the encoded data.

The system generates a bit stream from the signal (220). The system recovers the clock and determines bit values from the received signals.

The system shifts bits from the bit stream into a shift register until receiving a feedback signal from a synchronization decoder connected to the output of the shift register (230). As described above, the system can prealign the data in the shift register by using a synchronization decoder that receives the current output of the shift register. When the synchronization decoder determines that the data in the shift register is aligned according to the sync bits in the data, the synchronization decoder issues a feedback signal that causes a one UI bit time slip. By freezing the data in the shift register, the output of the shift register is prealigned to the word boundaries in the received bit stream.

The system descrambles the output of the shift register to generate descrambled data (240). For example, the system can multiply the output of the shift register by a descramble code to generate the descrambled data. The descramble code can be generated by any appropriate descramble code generator, e.g., a pseudorandom binary sequence generator.

The system can perform the multiplication using any appropriate multiplication module. In some implementations, the system uses as many XOR gates as bits in the output of the shift register to perform the multiplication. When the output of the shift register is aligned to word boundaries in the encoded data, the result of the multiplication is descrambled data.

The system stores the descrambled data in a first parallel register when the data is aligned in the shift register (250). For example, the synchronization decoder can issue an enable signal to a first parallel register, which traps the prealigned and descrambled output of the shift register.

The system determines whether the data in the first parallel register is properly aligned (260). For example, the synchronization decoder can use the sync bits of the descrambled data to determine whether the data is properly aligned.

If it is, the system removes the sync bits and stores the output data in a second parallel register (270). For example, the system can store the data in a FIFO output queue for use by a next-higher layer in the network protocol stack, e.g., a MAC layer. If the data is not properly aligned, the system can then perform a recovery mechanism to realign the data in the shift register.

Figure 3:
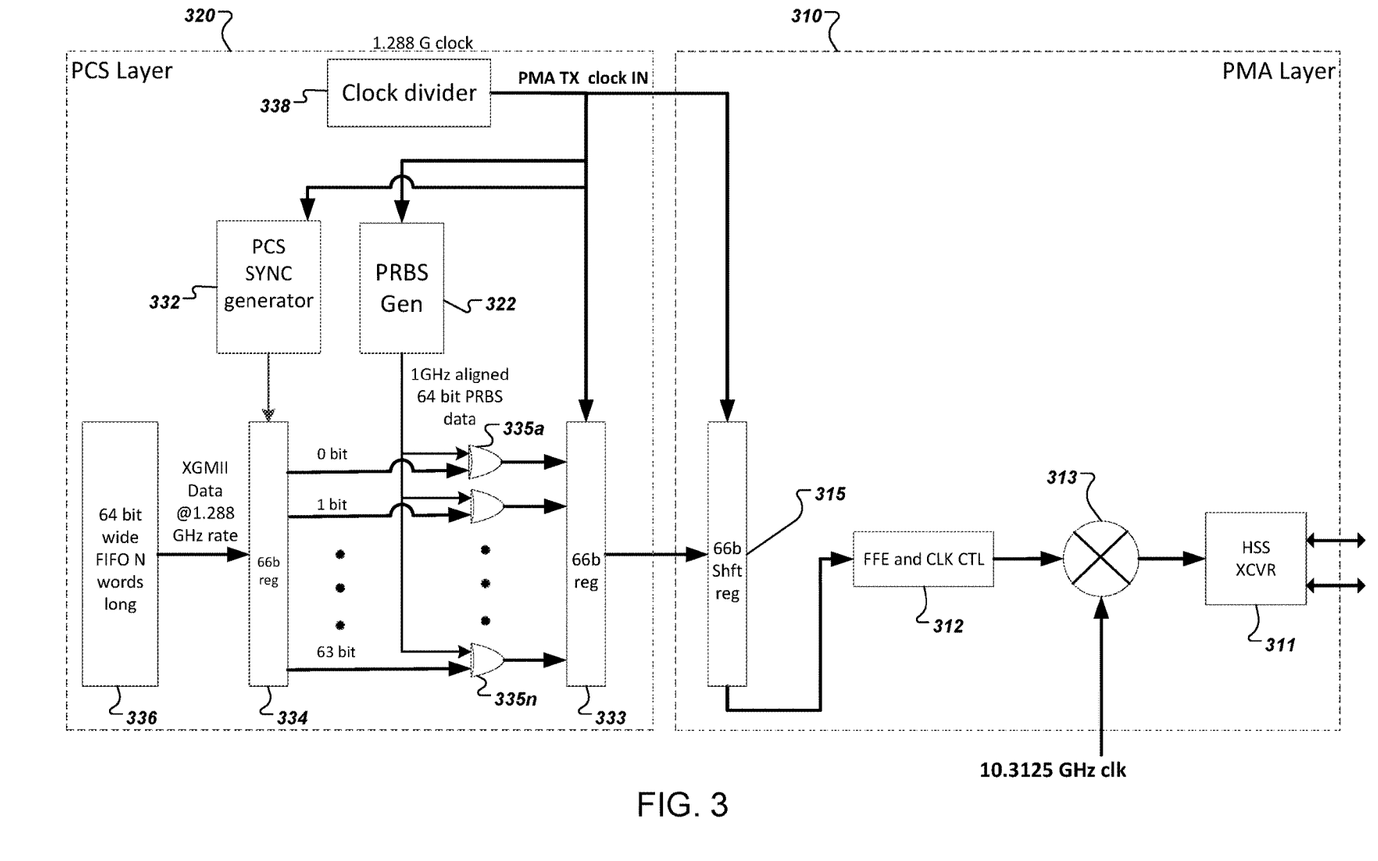
FIG. 3 illustrates the architecture of the transmitting end of an example low-latency network interface system.

FIG. 3 illustrates the architecture of the transmitting end of an example low-latency network interface system. The system includes a PMA layer 310 and a PCS layer 320. The PMA layer 310 and the PCS layer 320 can be implemented as separate devices or subsystems, or they can be implemented on a same device or subsystem.

As in the example for FIG. 1, the example in FIG. 3 illustrates a system that uses 66/64 bit encoding, 1.288 GHz data rate, and a 10.3125 GHz line rate. And the same techniques can be used in a system that uses other encodings or data and line rates.

The PCS layer 320 includes an input register 336 that receives data from a higher layer in the network protocol stack, e.g., the MAC layer. A clock divider 338 generates a PMA TX clock signal that drives a PCS Sync Generator 332 and a PRBS Generator 322.

The PCS Sync Generator 332 adds sync bits to the data received from the input register 336. In this example, the 64 bits of the input register 336 becomes a 66-bit word in the first register 334.

The PRBS Generator 322 generates a scramble code that is multiplied with the data received from the first register 334. This results in scrambled data being stored in a second register 333. In this example, the multiplication is implemented by corresponding XOR gates 335*a-n*.

A shift register 315 receives the parallel scrambled data from the second register 333. The system then serializes the data in the shift register 315 by shifting the data of the shift register 315 by a Feed Forward Equalizer and clock control (FFE and CLK CTL) module 312.

A mixer 313 receives the output of the FFE and CLK CTL module 312 and an output of a line rate clock signal. In this example, the line rate clock signal is 10.3125 Ghz. The mixer then provides the resulting encoding signal to a high-speed SerDes transceiver (HSS XCVR) 311. The HSS XCVR 311 then provides a signal containing a representation of the serialized bit stream to a Medium Dependent Interface layer of the communication medium is being used.

Figure 4:
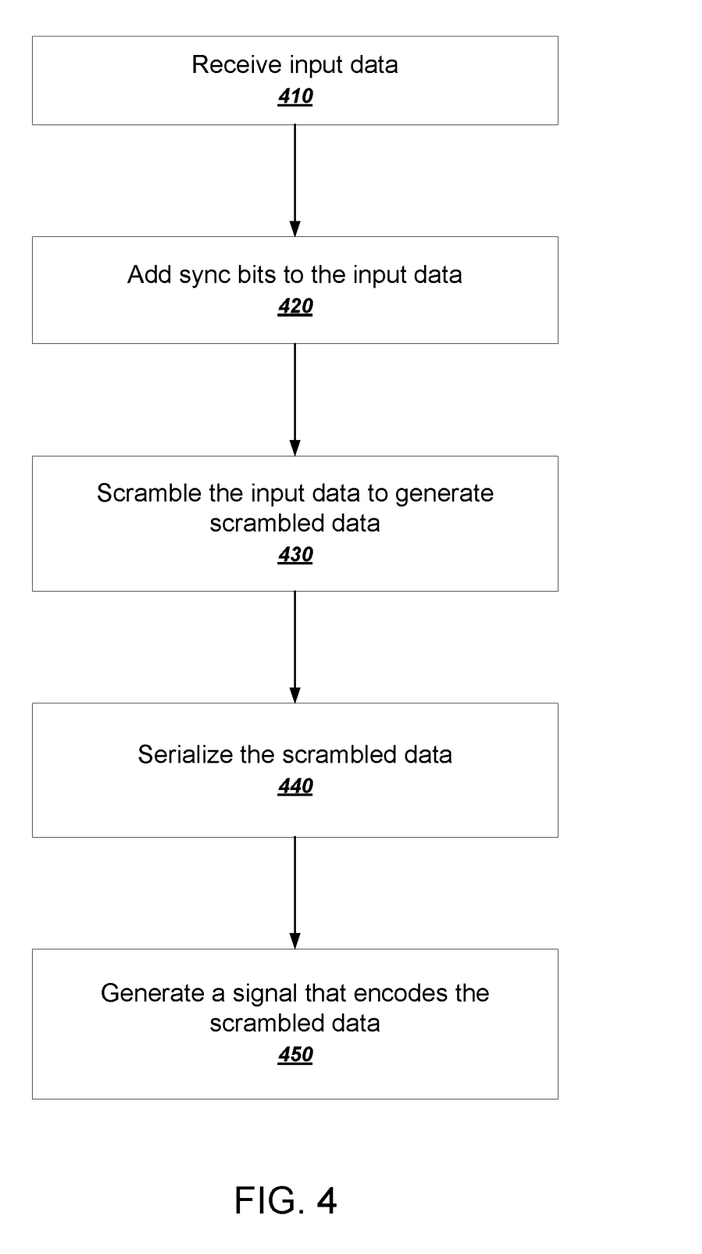
FIG. 4 is a flow chart of an example process for receiving data and transmitting the data into an output signal using a low-latency network interface.

FIG. 4 is a flow chart of an example process for receiving data and transmitting the data into an output signal using a low-latency network interface. The process will be described as being performed by an appropriately configured system having several functional components, e.g., the system as described above with reference to FIG. 3.

The system receives input data (410). For example, the system can receive data from a higher layer of a network protocol stack, e.g., the MAC layer.

The system adds synchronization bits to the input data (420). For example, if the system is using 66/64 encoding, a synchronization generator can examine the input data and determine whether to add a 01 for a data frame or 10 for a mixed control and data frame.

The system scrambles the data to generate scrambled data (430). For example, the system can multiply the output of the shift register by a scramble code to generate the scrambled data. The scramble code can be generated by any appropriate scramble code generator, e.g., a pseudorandom binary sequence generator.

The system can perform the multiplication using any appropriate multiplication module. In some implementations, the system uses as many XOR gates as bits in the input register plus the sync bits.

The system serializes the scrambled data (440). For example, the system can serialize the scrambled data by storing the scrambled data in a shift register and shifting the data out of the shift register.

The system generates a signal that encodes the scrambled data (450). For example, the system can generate an output signal using a clock generator and can provide the signal to a MDI layer for the communication medium being used.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

In addition to the embodiments described above, the following embodiments are also innovative:

Embodiment 1 is a system comprising:
a physical medium attachment (PMA) device configured to generate a bit stream from a signal having encoded data and to shift bits of the bit stream into a shift register until a feedback signal generated by a synchronization decoder is received;
the synchronization decoder that is connected to an output of the shift register and that is configured to issue the feedback signal to the PMA device whenever the data in the shift register is aligned to a word boundary;
a descramble code generator configured to generate a descramble code from a clock frequency different than a clock frequency of the output of the shift register of the PMA device, the descramble code generator being configured to provide the descramble code as a first input to a multiplication component;
a multiplication component configured to digitally multiply a current output of a shift register by the descramble code generated by the descramble code generator;
a first parallel register configured to receive the output of the multiplication component whenever the synchronization decoder indicates that the data in the shift register is aligned to a word boundary; and
a second parallel register configured to receive the data from the first parallel register whenever the synchronization decoder determines that the data in the first parallel register is properly aligned.

Embodiment 2 is the system of embodiment 1, wherein the shift register has a length that is at least as long as code words of the incoming bit stream, and wherein the system is configured to prealign entire code words of the bit stream in the shift register.

Embodiment 3 is system of any one of embodiments 1-2, wherein the descramble code generator is configured to operate at a rate slower than a data rate of data output from the shift register of the PMA device.

Embodiment 4 is the system of embodiment 3, wherein the data rate is a multiple of the rate of the descramble code generator.

Embodiment 5 is the system of any one of embodiments 1-4, wherein the synchronization decoder is configured to operate at a clock rate slower than a data rate of data output from the shift register of the PMA device.

Embodiment 6 is the system of embodiment 5, wherein the data rate is a multiple of the rate of the synchronization decoder.

Embodiment 7 is the system of any one of embodiments 1-6, wherein the descramble code generator operates outside of the path of data from the shift register to the second parallel register.

Embodiment 8 is the system of any one of embodiments 1-7, wherein the synchronization decoder operates outside of the path of data from the shift register to the second parallel register.

Embodiment 9 is the system of any one of embodiments 1-8, wherein the synchronization decoder is configured to send an enable signal to the first parallel register when the output of the shift register is aligned to a word boundary.

Embodiment 10 is the system of any one of embodiments 1-9, wherein the synchronization decoder is configured to send an enable signal to the second parallel register when the synchronization decoder determines that the data in the first parallel register is properly aligned.

Embodiment 11 is the system of any one of embodiments 1-10, wherein the system is configured to remove synchronization bits between the first parallel register and the second parallel register.

Embodiment 12 is a method comprising:
receiving a signal having encoded data;
generating a bit stream from the received signal;
shifting bits of the bit stream into a shift register until a feedback signal generated by a synchronization decoder is received;
after the feedback signal is received, descrambling output of the shift register to generate descrambled data;
storing the descrambled data in a first parallel register when the synchronization decoder determines that the data in the shift register is aligned to a word boundary;
determining whether the data in the first parallel register is properly aligned; and
storing the output in a second parallel register when the data in the first parallel register is properly aligned.

Embodiment 13 is the method of embodiment 12, wherein the shift register has a length that is at least as long as code words of the incoming bit stream, and wherein shifting bits of the bit stream into a shift register until a feedback signal generated by a synchronization decoder is received comprises prealigning entire code words of the bit stream in the shift register.

Embodiment 14 is the method of any one of embodiments 12-13, wherein descrambling output of the shift register comprises using a descramble code generator that is configured to operate at a rate slower than a data rate of data output from the shift register.

Embodiment 15 is the method of embodiment 14, wherein the data rate is a multiple of the rate of the descramble code generator.

Embodiment 16 is method of any one of embodiments 12-15, wherein the descramble code generator operates outside of the path of data from the shift register to the second parallel register.

Embodiment 17 is the method of any one of embodiments 12-16, wherein the synchronization decoder is configured to operate at a clock rate slower than a data rate of data output from the shift register of the PMA device.

Embodiment 18 is the method of embodiment 17, wherein the data rate is a multiple of the rate of the synchronization decoder.

Embodiment 19 is the method of any one of embodiments 12-18, wherein the synchronization decoder operates outside of the path of data from the shift register to the second parallel register.

Embodiment 20 is the method of any one of embodiments 12-19, further comprising sending, by the synchronization decoder, an enable signal to the first parallel register when the output of the shift register is aligned to a word boundary.

Embodiment 21 is the method of any one of embodiments 12-20, further comprising, sending, by the synchronization decoder, an enable signal to the second parallel register when the synchronization decoder determines that the data in the first parallel register is properly aligned.

Embodiment 22 is the method of any one of embodiments 12-21, further comprising removing synchronization bits between the first parallel register and the second parallel register.

While this specification contains many specific implementation details, these should not be construed as limitations on the scope of any invention or of what may be claimed, but rather as descriptions of features that may be specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
a physical medium attachment (PMA) device configured to generate a bit stream from a signal having encoded data and to shift bits of the bit stream into a shift register until a feedback signal generated by a synchronization decoder is received;
the synchronization decoder that is connected to an output of the shift register of the PMA device and that is configured to issue the feedback signal to the PMA device whenever data in the shift register of the PMA device is aligned to a word boundary;
a descramble code generator configured to generate a descramble code from a clock frequency different than a clock frequency of the output of the shift register of the PMA device, the descramble code generator being configured to provide the descramble code as a first input to a multiplication component;
a multiplication component configured to digitally multiply a current output of the shift register of the PMA device by the descramble code generated by the descramble code generator;
a first parallel register configured to receive the output of the multiplication component whenever the synchronization decoder indicates that the data in the shift register of the PMA device is aligned to a word boundary; and
a second parallel register configured to receive data from the first parallel register whenever the synchronization decoder determines that the data in the first parallel register is properly aligned.

2. The system of claim 1, wherein the shift register of the PMA device has a length that is at least as long as code words of the bit stream, and wherein the system is configured to prealign entire code words of the bit stream in the shift register of the PMA device.

3. The system of claim 1, wherein the descramble code generator is configured to operate at a rate slower than a data rate of data output from the shift register of the PMA device.

4. The system of claim 3, wherein the data rate of data output from the shift register of the PMA device is a multiple of the rate of the descramble code generator.

5. The system of claim 1, wherein the synchronization decoder is configured to operate at a clock rate slower than a data rate of data output from the shift register of the PMA device.

6. The system of claim 5, wherein the data rate of data output from the shift register of the PMA device is a multiple of the clock rate of the synchronization decoder.

7. The system of claim 1, wherein the descramble code generator operates outside of a path of data from the shift register of the PMA device to the second parallel register.

8. The system of claim 1, wherein the synchronization decoder operates outside of a path of data from the shift register of the PMA device to the second parallel register.

9. The system of claim 1, wherein the synchronization decoder is configured to send an enable signal to the first parallel register when the output of the shift register of the PMA device is aligned to a word boundary.

10. The system of claim 1, wherein the synchronization decoder is configured to send an enable signal to the second parallel register when the synchronization decoder determines that data in the first parallel register is properly aligned.

11. A method comprising:
receiving a signal having encoded data;
generating a bit stream from the received signal;
shifting bits of the bit stream into a shift register until a feedback signal generated by a synchronization decoder is received;
after the feedback signal is received, descrambling output of the shift register to generate descrambled data;
storing the descrambled data in a first parallel register when the synchronization decoder determines that data in the shift register is aligned to a word boundary;
determining whether data in the first parallel register is properly aligned; and
storing the output of the first parallel register in a second parallel register when the data in the first parallel register is properly aligned.

12. The method of claim 11, wherein the shift register has a length that is at least as long as code words of the bit stream, and wherein shifting bits of the bit stream into a shift register until a feedback signal generated by a synchronization decoder is received comprises prealigning entire code words of the bit stream in the shift register.

13. The method of claim 11, wherein descrambling output of the shift register comprises using a descramble code generator that is configured to operate at a rate slower than a data rate of data output from the shift register.

14. The method of claim 13, wherein the data rate of data output from the shift register is a multiple of the rate of the descramble code generator.

15. The method of claim 13, wherein the descramble code generator operates outside of a path of data from the shift register to the second parallel register.

16. The method of claim 11, wherein the shift register is a shift register of a physical medium attachment (PMA) device, and wherein the synchronization decoder is configured to operate at a clock rate slower than a data rate of data output from the shift register of the PMA device.

17. The method of claim 16, wherein the data rate of data output from the shift register of the PMA device is a multiple of the clock rate of the synchronization decoder.

18. The method of claim 11, wherein the synchronization decoder operates outside of a path of data from the shift register to the second parallel register.

19. The method of claim 11, further comprising sending, by the synchronization decoder, an enable signal to the first parallel register when the output of the shift register is aligned to a word boundary.

20. The method of claim 11, further comprising, sending, by the synchronization decoder, an enable signal to the second parallel register when the synchronization decoder determines that the data in the first parallel register is properly aligned.

* * * * *

UNITED STATES PATENT AND TRADEMARK OFFICE
CERTIFICATE OF CORRECTION

| | | |
|---|---|---|
| PATENT NO. | : 9,565,124 B2 | Page 1 of 1 |
| APPLICATION NO. | : 15/068407 | |
| DATED | : February 7, 2017 | |
| INVENTOR(S) | : Kerr | |

It is certified that error appears in the above-identified patent and that said Letters Patent is hereby corrected as shown below:

On the Title Page

Item (71) Applicant: delete "Incorporation" and insert --Incorporated-- therefor.

Signed and Sealed this
Twenty-fifth Day of April, 2017

Michelle K. Lee
*Director of the United States Patent and Trademark Office*